United States Patent [19]

Miller et al.

[11] Patent Number: 5,958,758
[45] Date of Patent: *Sep. 28, 1999

[54] TREATMENT OF ANIMAL WASTE

[75] Inventors: Guy W. Miller, St. Louis Park; Gregory Scott Patterson, Minneapolis, both of Minn.

[73] Assignee: Biosun Systems Corporation, St. Louis Park, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/905,573

[22] Filed: Aug. 4, 1997

[51] Int. Cl.$^6$ .................................................. C07G 15/00
[52] U.S. Cl. ............................ 435/268; 435/824; 210/611
[58] Field of Search .................................... 210/601, 611; 435/268, 842, 824

[56] References Cited

U.S. PATENT DOCUMENTS

| | | | |
|---|---|---|---|
| 3,878,303 | 4/1975 | Hashimoto | 426/56 |
| 4,467,035 | 8/1984 | Harasawa et al. | 435/253 |
| 5,271,845 | 12/1993 | Paquin | 210/606 |
| 5,627,069 | 5/1997 | Powlen . | |

FOREIGN PATENT DOCUMENTS

| | | | |
|---|---|---|---|
| 025 07 111 | 9/1976 | Germany | 210/611 |
| 60-000895 | 1/1985 | Japan . | |
| 0 766 631 | 9/1980 | U.S.S.R. | 210/611 |

OTHER PUBLICATIONS

[Author unknown] (1993) "Treatment of Hydrogen Sulphide", *W&WT,* pp. 30–31.

Amon, Marko et al. (1995) "Odour and ammonia emissions from broiler houses: a farm scale study on the use of De–Odorase® and clinoptilolite zeolite", Proceedings '95—New Knowledge in Livestock Odor Solutions; International Livestock Odor Conference '95, Iowa State University of Science and Technology, Ames, Iowa (56–60).

Barker, James C. (Jan. 1983, Rev. 90) "Lagoon Design and Management for Livestock Waste Treatment and Storage", *Agri–Waste Management,* North Carolina Agricultural Extension Service, North Carolina University, Raleigh, NC (1–10).

Barrington S. et al. (1995) "Zeolite to Control Swine Manure Odours and Nitrogen Volatilization", Proceedings '95—New Knowledge in Livestock Odor Solutions; International Livestock Odor Conference '95, Iowa State University of Science and Technology, Ames, Iowa (65–68).

Barrington, S. F. (1995) "Biological Additives and Biofilters", Proceedings '95—New Knowledge in Livestock Odor Solutions; International Livestock Odor Conference '95, Iowa State University of Science and Technology, Ames, Iowa (185–191).

Beaudet, R., et al. (Apr. 1990) "Microbiological Aspects of Aerobic Thermophilic Treatment of Swine Waste", *Applied and Environmental Microbiology* 56(4):971–976.

Bourque, Denis, et al. (Jan. 1987) "Microbiological Degradation of Malodorous Substances of Swine Waste under Aerobic Conditions", *Applied and Environmental Microbiology* 53(1):137–141.

Brune, Daniel C. (1989) "Sulfur oxidation by phototrophic bacteria", *Biochimica et Biophysica Acta,* 975:189–221.

Buchanan, R.E., et al (1984) *Bergy's Manual of Determinataive Bacteria,* 10th Ed., Williams & Wilkins Co., Baltimore, MD, pp. 1636–1638; 1660–1661 1683 1696–1697; 1707–1708; and 1834–1837.

Bundy, Dwaine S., et al. (1995) "Evaluation of Alkaline By–Products for the Control of Swine Odors in Manure Storage", Proceedings '95—New Knowledge in Livestock Odor Solutions; International Livestock Odor Conference '95, Iowa State University of Science and Technology, Ames, Iowa (73–76).

Clark, Charles E. (Dec. 1995) "Hog Waste Disposal by Lagooning", *Journal of the Sanitary Engineering Division—Proceedings of the American Society of Civil Engineers;* SA 6 (27–39).

Cole, C. et al., 1985 *Managing Livestock Wastes,* 374–377 "Odor Control of Liquid Dairy and Swine Manure Using Chemical and Biological Treatments".

Cooper, Robert C. "Treatment of Organic Industrial Wastes by Lagooning", (351–364). (full citation date and journal are unknown).

Cunnick, Joan E. (1995) "Implications of Environmental Odor on Psychological Status and Health", Proccedings '95—New Knowledge in Livestock Odor Solutions; International Livestock Odor Conference '95, Iowa State University of Science and Technology, Ames, Iowa (156–159).

DiPietre, Dennis, et al. (1995) "An Economic Analysis of Resource Recover and Odor Reduction: Premium Standard Farms Digester Cover Project", Proceedings '95—New Knowledge in Livestock Odor Solutions; International Livestock Odor Conference '95, Iowa State University of Science and Technology, Ames, Iowa (77–79).

Evans, M. R, et al. (1986) "Aeration and Control of Slurry Odours by Heterotrophs", *Agricultural Wastes,* 15:187–204.

Evans, M. R., et al. (1983) "The Effect of Temperature and Residence Time on Aerobic Treatment of Piggery Slurry—Degradation of Carbonaceous Compounds", *Agricultural Wastes* 5:25–36.

(List continued on next page.)

*Primary Examiner*—David A. Redding
*Attorney, Agent, or Firm*—Merchant & Gould P.C.

[57] ABSTRACT

A process for treating an animal waste in a waste holding facility to reduce sulfides and enhance efficient degradation of large amounts of organic matter with reduced odor. The process includes a first inoculation with sulfide-utilizing bacteria and a second inoculation with organic digesting bacteria and lytic enzymes. The second organic digesting inoculation is performed at a time when the sulfide content of the animal waste in the facility is adequately reduced to support organic digesting bacterial growth and efficient degradation of organic matter.

15 Claims, No Drawings

OTHER PUBLICATIONS

Fulhage, Charles (1995) "Design and Management of Lagoons to Minimize Odor", Proceedings '95—New Knowledge in Livestock Odor Solutions; International Livestock Odor Conference '95, Iowa State University of Science and Technology, Ames, Iowa (196–199).

Fulhage, Charles (1995) "Manure Storage", Proceedings '95—New Knowledge in Livestock Odor Solutions; International Livestock Odor Conference '95, Iowa State University of Science and Technology, Ames, Iowa (192–193).

Ginnivan, M. J. (1983) "The Effect of Aeration Rates on Odour and Solids of Pig Slurry", *Agricultural Wastes* 7:197–207.

Goodrich, Philip R. et al. (1995) "Odor Reduction in Swine Manure using Bubbleless Oxgenation", Proceedings '95—New Knowledge in Livestock Odor Solutions; International Livestock Odor Conference '95, Iowa State University of Science and Technology, Ames, Iowa (2–4).

Hashimoto, Andrew G. (1983) "Thermophilic and Mesophilic Anaerobic Fermentation of Swine Manure", *Agricultural Wastes* 6:175–191.

Hobbs, Dr. Philip (1995) "Dietary Control of Odors", Proceedings '95—New Knowledge in Livestock Odor Solutions; International Livestock Odor Conference '95, Iowa State University of Science and Technology, Ames, Iowa (200–202).

Hobbs, Dr. Philip et al. (1995) "Odor Reduction in Fresh Pig Slurry by Dietary Manipulation of Protein", Proceedings '95—New Knowledge in Livestock Odor Solutions; International Livestock Odor Conference '95, Iowa State University of Science and Technology, Ames, Iowa (5–10).

Høyvik, Henrik, et al. (1995) "FYMOL™: An Environmentally Friendly Method to Control Odor from Manure", Proceedings '95—New Knowledge in Livestock Odor Solutions; International Livestock Odor Conference '95, Iowa State University of Science and Technology, Ames, Iowa (102–105).

Jolly, Robert, et al. (1995) "Economic Issues in Livestock Odor Reduction", Proceedings '95—New Knowledge in Livestock Odor Solutions; International Livestock Odor Conference '95 , Iowa State University of Science and Technology, Ames, Iowa (163–167).

Joye, Samantha B. et al. (1995) "Influence of Sulfide Inhibition of Nitrification on Nitrogen Regeneration in Sediments", *Science,* 270:623–625.

Kotz, Kevin (Nov. 13, 1984) "Good bugs' getting the job done in city's sewage lagoons", *The Redwood Gazette,* Redwood Falls, Minnesota, No. 30.

Lawrence, Alonzo W., et al., (1990) "The Effects Of Sulfides On Anaerobic Treatment", pp. pp. 343–347. (journal unknown).

Lohr, Luanne (1995) "Factors Related to Odor Perceptions and Annoyance in a Rural Context", Proceedings '95–13 New Knowledge in Livestock Odor Solutions; International Livestock Odor Conference '95, Iowa State University of Science and Technology, Ames, Iowa (22–27).

McFarlane, Paul N., et al. "The Occurrence of Purple Sulfur Bacteria in Anaerobic Lagoons—Theory and Application", pp. (full citation unknown).

Melvin, Stewart W. (1995) "Manure Storage", Proceedings '95—New Knowledge in Livestock Odor Solutions; International Livestock Odor Conference '95, Iowa State University of Science and Technology, Ames, Iowa (203–205).

Mézáros, György, et al. (1995) "Minimizing Odour and Slurry Emission of Pig Husbandry by Biofilter and Litter Housing System", Proceedings'95—New Knowledge in Livestock Odor Solutions; International Livestock Odor Conference '95, Iowa State University of Science and Technology, Ames, Iowa (111–113).

Miner, J. Ronald (1995) "Chemical Additives", Proceedings '95—New Knowledge in Livestock Odor Solutions; International Livestock Odor Conference '95, Iowa State University of Science and Technology, Ames, Iowa (206–207).

Miner, J. Ronald et al. (1995) "A Floating Permeable Blanket to Prevent Odor Escape", Proceedings '95—New Knowledge in Livestock Odor Solutions; International Livestock Odor Conference '95, Iowa State University of Science and Technology, Ames, Iowa (28–34).

O'Neill, D. H., et al. (1991) "A Review of the Control of Odour Nuisance from Livestock Buildings: Part 1, Influence of the Techniques for Managing Waste Within the Building", *J. Agric. Engng Res.* 50:1–10.

O'Neill, D. H., et al. (1992) "A Review of the Control of Odour Nuisance from Livestock Buildings: Part 2, The Costs of Odour Abatement Systems as Predicted from Ventilation Requirements", *J. Agric. Engng Res.* 51:157–165.

O'Neill, D. H., et al. (1992) "A Review of the Control of Odour Nuisance from Livestock Buildings: Part 3, Properties of the Odorous Substances which have been Identified in Livestock Wastes or in the Air around them", *J. Agric. Engng Res.* 53:23–50.

Patterson, Charles T. (1995) "The Litigation Aspects of Livestock Odor Control", Proceedings '95—New Knowledge in Livestock Odor Solutions; International Livestock Odor Conference '95, Iowa State University of Science and Technology, Ames, Iowa (172–181).

Person, Howard, et al. (1995) "Recommended Human Relations Management Practices Within a Technological and Social System Involving Livestock Odor Issues.", Proceedings '95—New Knowledge in Livestock Odor Solutions; International Livestock Odor Conference '95, Iowa State University of Science and Technology, Ames, Iowa (211–214).

Postgate, John (1959) "Sulphate Reduction by Bacteria", *Annual Review of Microbiology* 13:505–520.

Powers, Wendy J. Ph.D. et al. (1995) "Effect of Anaerobic Digestion and Commercial Additivies on Odors from Liquid Dairy Manure", Proceedings '95—New Knowledge in Livestock Odor Solutions; International Livestock Odor Conference '95, Iowa State University of Science and Technology, Ames, Iowa (44–49).

Sievers, D. M. et al. (1994), "Treatment of Dilute Manure Wastewaters by Chemical Coagulation", *Transactions of the ASAE* 37(2):597–601.

Sletten, Owen, et al. (1971) "Sulfur Bacteria in Red Lagoons", *Journal WPCF* 43(10):2118–2122.

Summers, R., et al. (1980) "A Detailed Study of Piggery–Waste Anaerobic Digestion", *Agriculturas Wastes* 2:61–78.

Sutton, A. L., et al. (1995) "Changing Nitrogen Levels in Swine Diets to Reduce Manure Odors", Proceedings '95—New Knowledge in Livestock Odor Solutions; International Livestock Odor Conference '95, Iowa State University of Science and Technology, Ames, Iowa (127–129, and table).

Van Lotringen, Theo J. M., et al. (Oct. 23, 1985?) "$H_2S$ Removal By Purple Sulfur Bacteria In Swine Waste Lagoons", pp. (full citation unknown).

Wachenheim, Cheryl, et al. (1995) "Testing the Efficiency of Commercially Available Feed Additives as a Means to Improve Pig Performance and Air Quality", Proceedings '95—New Knowledge in Livestock Odor Solutions; International Livestock Odor Conference '95, Iowa State University of Science and Technology, Ames, Iowa (145–148).

Weaver, D. M., et al. (1994), "Phosphorous Removal from Piggery Effluents of Varying Quality Using Lime and Physico–Chemical Treatment Methods", *Environmental Pollution* 84:237–244.

Welsh, F. W., et al. (1977) "The Effect of Anaerobic Digestion Upon Swine Manure Odors", *Canadian Agricultural Engineering* 19(2):122–126.

Westerman, Philip W., et al. (1995) "Aerobic Treatment of Animal Waste for Odor Control", Proceedings '95—New Knowledge in Livestock Odor Solutions; International Livestock Odor Conference '95, Iowa State University of Science and Technology, Ames, Iowa (218–222).

Wilkie, Ann C., et al. (1995) "Anaerobic Treatment Technology—An Integrated Approach to Controlling Manure Odors", Proceedings '95—New Knowledge in Livestock Odor Solutions; International Livestock Odor Conference '95, Iowa State University of Science and Technology, Ames, Iowa (223–227).

Williams, A. G., et al. (1989) "The Oxygen Requirements for Deodorizing and Stabilizing Pig Slurry by Aerobic Treatment", *J. Agric. Engng Res.* 43:291–311.

Williams, C. M. (Mike), et al. (1995) "Livestock Odor Control Additivies: Effectiveness and Laborabory–Scale Protocol for Evaluation", Proceedings '95—New Knowledge in Livestock Odor Solutions; International Livestock Odor Conference '95, Iowa State University of Science and Technology, Ames, Iowa (50–53).

Williams, C. M. (1995) "Odor Control Additives: Protocol for Evaluation", In Nuisance Concerns in Animal Manure Management: Odors and Flies—Proceedings of Conference held Mar. 21–22, 1995, Gainsfille, FL, pp. 36–43.

5,958,758

TREATMENT OF ANIMAL WASTE

FIELD OF THE INVENTION

The present invention relates generally to the storage and treatment of animal wastes generated at facilities where animals such as hogs or cattle are raised. More particularly, the invention relates to a microbial process for treating animal waste in waste holding facilities in order to reduce the sulfide content and enhance efficient degradation of the waste without significant odor.

Background of the Invention

The raising of large numbers of animals such as hogs and cattle for human consumption leads to the production of large amounts of organic waste materials. Typically, the waste is collected and maintained in animal waste holding facilities, pits, or lagoons. Theoretically, bacteria in the waste materials work in concert to degrade organic matter over time.

Stresses placed on the ecology of the facility, including overloading of organic matter, changes in pH, temperature, and the like, disturb the ecology of the facility. Sulfide-producing bacteria dominate in a stressed facility, producing sulfides that are toxic to the growth and degradation activities of microorganisms. This results in a system that is inefficient in degrading wastes and continues to produce large amounts of hydrogen sulfides, volatile fatty acids, ammonia, and other malodorous compounds that create an unhealthy biomass in the waste facility.

Attempts to add bacteria to a stressed, sulfide-rich facility have had limited success, due to the unfavorable conditions for their growth. Sulfur-degrading bacteria have been used to oxidize sulfides in some systems, but the effect is short-lived and fails to completely detoxify the facility and/or degrade organic matter.

There is a need and demand for a process for treating animal waste in a holding facility to create a healthy biomass to efficiently degrade organic waste and control solids build-up without toxicity and importantly, without the odors caused by sulfides, ammonia, and volatile fatty acids.

SUMMARY OF THE INVENTION

The present invention provides a process for the treatment of large amounts of animal waste in a holding facility, which process reduces sulfide levels to that which are non-toxic to organic digesting bacteria. The process provides an appropriate microbial environment and enhances efficient degradation of large amounts of animal wastes without toxicity, organic matter build up, and without odors caused by sulfides, ammonia, and volatile fatty acids.

The process of the invention includes two essential steps: First, sulfide-rich animal waste is treated with sulfide-utilizing bacteria for a time and under conditions sufficient to lower the sulfide concentration to a level that permits efficient growth and activity of organic digesting bacteria. Preferably, the filtered sulfide concentration is reduced to below 5 ppm, more preferably less than 1 ppm, and most preferably to below 0.5 ppm. A mixture of organic digesting bacteria is then added to the sulfide-lowered animal waste in the facility, optionally and preferably with a mixture of lytic enzymes and a circulation system such as an air diffusion system. This two-step process reduces or eliminates toxic sulfides, and quickly provides an appropriate environment for growing organic digesting bacteria, generally within 20–60 days. The process permits enhanced degradation of large amounts of animal wastes in a shorter time period than in an untreated facility, and with reduced odor from the facility.

Detailed Description of the Preferred Embodiment

For the purposes of understanding the invention, reference is now made to the preferred embodiments. No limitation of scope is intended by this description.

Definitions

The following terms have the described definition for purposes of this invention:

"Waste holding facility"—A facility for the holding, storage, and treatment of animal waste, such as a pit or lagoon. The facility is exemplified by those found in large animal farms such as those raising hogs or cattle for consumption.

"Treating"—Treating includes inoculating animal waste with bacteria and enzymes designed to enhance efficient degradation of organic matter with reduced odors.

"Sulfide-rich animal waste" is defined as malodorous animal waste harboring sulfide compounds, which waste is beneficially treated by the process of the invention. In general, the filtered sulfide content of the sulfide-rich animal waste ranges from about 1 ppm to about 20 ppm or greater.

"Innoculum"—One or more bacteria added to the animal waste material in the waste facility. The innoculum may be dried or fluid, mixed with a carrier or medium, and may include one or a mixture of bacteria.

"Sulfide-utilizing bacteria"—Bacteria capable of utilizing sulfide, which may be anaerobic, aerobic, or facultative. Preferred is a consortium of sulfide-utilizing bacteria that includes bacteria which oxidize sulfide compounds. Most preferred is a consortium that includes bacteria capable of internalizing sulfur. Examples of useful sulfide-utilizing bacteria are found, for example, in Bergy's Manual, and include species of Purple Non-Sulfur Bacteria (e.g., *Rhodospirillium*), Chromatianeae (e.g., *Chromatium*), Green Sulfur Bacteria (e.g., *Chlorobium*), Colorless Sulfur Bacteria (e.g., *Thiobacaterium*), and Filamentous Green bacteria (e.g., *Chloroflexus*). A preferred mixture of sulfide-utilizing bacteria including *Rhodospirillium, Chromatium* and *Thiobacillus* is commercially available from Syneco Systems, Inc. (St. Louis Pk, Minn.) under the trade name Persnickety Brand 713™.

"Lowered-sulfide waste"—A lowered-sulfide waste of the invention is a waste treated with sulfide-utilizing bacteria to decrease the content of sulfides. In general, a lowered-sulfide waste is a treated waste capable of sustaining growth and activity of organic digesting bacteria. The filtered sulfide content of the lowered-sulfide waste can range from about 0.5 ppm or less to about 5 ppm or less. It is appreciated that the lower the content of sulfide in the waste, the more efficient the organic digesting bacteria.

"Filtered sulfide"—The filtered sulfide content of animal waste in an animal waste facility is determined using standard methods and analysis, for example method EPA 375.4. In general, a sample of the waste slurry is filtered to remove solids, and the filtrate is analyzed for sulfide content. In general, the filtered sulfide content of a sample is about 30–40% of the sample's measured solids sulfide content.

"Organic digesting bacteria"—Organic digesting bacteria of the present invention are those bacteria which degrade organic matter commonly found in animal wastes. The organic digesting bacteria may be aerobic, anaerobic, or facultative. Preferably, the organic digesting bacteria of the invention produce lytic enzymes such as proteases, lipases, cellulases, and amylases that degrade organic matter. Also preferred are bacteria that utilize ammonia and volatile fatty acids. Useful organic digesting bacteria include species of *Bacillus, Desulfotomaculum, Clostridium,* and *Deimococcaceae.* Particularly useful is a consortium of bacteria capable of a variety of degradation activities. For example, a commercial mixture of organic digesting bacteria including *licheniformis, amyloliquifaciens,* and *subtilus* provided with a mixture of lytic enzymes from Athea Labs (Milwaukee, Wis.) under the trade name Digestase 900™ is particularly useful.

"Lytic enzymes"—Herein, lytic enzymes are defined as those enzymes capable of degrading organic matter typically found in animal waste facility. Useful lytic enzymes include proteases, lipases, cellulases, and amylases. A preferred mixture of lytic enzymes is commercially available with a mixture of organic digesting bacteria as described above from Athea Labs under the trade name Digestase 900™.

"Circulating"—As used in this invention, circulating means to cause the contents of the animal waste facility to circulate, or to be stirred up. Conventional methods for circulating the contents of an animal waste facility include rotating blades or paddles, and aeration systems. A preferred method of circulation uses a commercial diffused air system to circulate the contents of the facility with compressed air (oxygen).

Animal Waste Facility

The method of the invention treats a malodorous animal waste facility to reduce or eliminate odors and to produce an efficient system for degrading organic matter. The facility is treated to lower the sulfide content, and to enhance the growth conditions for organic digesting bacteria. In general, a facility where the filtered sulfide content measures 1 ppm or greater is malodorous and inefficient in degrading organic matter. In order to rapidly reduce odor and convert the environment of the waste facility to conditions for efficient waste degradation, the process of the invention first lowers the sulfide content. Organic digesting bacteria and enzymes are added at a time when the facility can efficiently utilize them to degrade organic waste.

The bacterial innoculum of the first or second process step may be added to the waste material in the waste holding facility as a dry powder (e.g., lyophilized, active bacteria), in liquid suspension, in a sol or gel, or in any convenient dispensing medium.

First Process Step

To rapidly lower the sulfide content of the animal waste in the facility, the animal waste is first inoculated with sulfide-utilizing bacteria. The amount of bacteria in the first innoculum will vary with specific treatment conditions, including temperature, pH, and the like. In general, the first innoculum is sufficient to deliver approximately $10^5$–$10^{10}$ sulfide-utilizing bacteria per ml of waste fluid, and preferably about $10^6$–$10^8$ bacteria per ml.

The sulfide-utilizing bacterial innoculum can include one or more of the bacteria shown below in Table 1. A preferred innoculum of sulfide-utilizing bacteria is commercially available from Syneco Systems, Inc. (St. Louis Park, Minn.) under the trade name Persnickety Brand 713™.

TABLE 1

Sulfide-Utilizing Bacteria

| Purple Bacteria Chromatium | Purple Non-Sulfur Bacteria | Green Sulfur Bacteria | Filamentous Green Bacteria | Colorless Sulfur and Other Bacteria |
| --- | --- | --- | --- | --- |
| Chromatium | Rhodospirillum | Chlorobium | Chloroflexus | Beggiatoaceae |
| Thiocystis | Rhodobacter | Prosthecochloris | Chloronema | Achromatium |
| Thiospirillum | Rhodopseudomonas | Pelodictyon | Oscillochloris | Thiobacterium |
| Thiocapsa | Rhodomicrobium | Ancalochloris | | Macromonma |
| Lamprocystis | Rhodopila | Chloroherpeton | | Thiospira |
| Lamprobacter | | | | Thiovulum |
| Thiopedia | | | | Bilophocucus |
| | | | | Thiobacillus |
| | | | | Thiomicrospira |
| | | | | Thiodendron |
| | | | | Thiosphaera |
| | | | | Acidiphilium |
| | | | | Thermothrix |
| | | | | Sulfolobus |
| | | | | Acidianus |

The sulfide-utilizing bacteria in the inoculated facility is permitted to acclimate and to degrade sulfide compounds present in the facility. After a period of time sufficient to lower sulfide content and provide conditions for efficient growth and activity of organic digesting bacteria, the second process step is initiated.

The second process step (addition of the second innoculum) is preferably initiated when filtered sulfide content is less than 1 ppm. Sufficient growth conditions to support some organic digesting bacterial growth can exist at higher filtered sulfide levels, for example, up to about 5 ppm. It is generally understood that the organic digesting bacteria are more efficient at lower sulfide levels (e.g. less than 1 ppm).

For a standard animal waste facility (about 1.5 million gallons of fluid waste) having an initial filtered sulfide content of about 5–20 ppm, and a fluid waste temperature of about 70–75° F., after a first innoculum of about $10^6$–$10^8$ sulfide-utilizing bacteria per ml fluid waste, the filtered sulfide content is expected to decline to less than 1 ppm in about 7 to 21 days. Under these conditions, to achieve a desirable efficiency of organic matter degradation without odors, the second innoculum (organic digesting bacteria) is preferably added about day 7–14. The time required to sufficiently reduce the sulfide level in the waste facility will vary according to factors including the condition of the facility at the time of treatment (such as initial sulfide content), composition of the organic matter, environmental conditions during treatment, (such as temperature and pH) and the like. In general, the sulfide-utilizing bacteria are most effective in lowering the sulfide content under conditions of neutral or near neutral pH (6.5–7.5) and warm temperatures (70–120° F.). While the time interval between process Step 1 and process Step 2 will vary between 0 and about 21 days, preferably, the time interval will range between 3 and 21 days, and most preferably between 7–14 days.

Second Process Step

The second innoculum of organic digesting bacteria includes one or more species of *Bacillus, Desulfotomaculum, Clostridium,* and *Deimococcaeceae*. Species of *Bacillus* are preferred. Most preferred is a consortium of organic digesting bacteria which is capable of digesting or utilizing a variety of organic compounds. Also preferred are those organic digesting bacteria that produce lytic enzymes capable of degrading organic compounds found in animal waste. The innoculum for the second process step optionally and preferably further includes lytic enzymes for digesting organic matter. Preferred lytic enzymes include proteases, lipases, cellulases, and amylases.

A most preferred innoculum for use in this second process step of the invention, contains an equal mixture of three species of *Bacillus: licheniformis, amyloliquidifaciens,* and *subtilis* together with protease (10,000 PV units/g), amylase (300 DV units/g), lipase (1500 TAU units/g) and cellulase and is commercially available from Athea Labs, (Milwaukee, Wis.) under the trade name Digestase 900™.

Circulation

During the second process step, and continuing during the organic digesting phase of the treatment, it is preferred to circulate the fluid material of the facility in order to maximize the effect of the bacteria and enzymes. Circulation may be achieved by a number of known methods, including paddle, blade or fluid systems. A most preferred circulation system is a diffused air system placed in, and preferably at the bottom of the facility to produce a plume of air which rises to the surface to create a mixing action. Suitable air diffusion systems are commercially available, for example, from Clean Flow Laboratories (Plymouth, Minn.). An aspirator-type system which causes circulation by injecting air at the surface of the facility is commercially available from Aeration Industries (Minneapolis, Minn.).

A useful diffuser system produces an output of about 10 cubic ft/minute (cfm) per surface acre of the facility. This is accomplished with a 10 psi, 10 cfm rotary vane compressor and two diffusers.

Maintenance

To maintain an animal waste facility capable of efficiently degrading large amounts of animal waste (e.g., amounts that would typically overload a non-treated facility's degradation capacity) with reduced odor and reduced solids build-up, the two-step process of the invention is periodically applied to the facility.

The specific time interval between periodic applications of the process of the invention varies with the specific conditions of the facility: e.g., amount of new animal waste deposited, the size of the facility, the environmental conditions since last application, and the like.

In general, for most commercial facilities, the process of the invention is applied at about monthly intervals to maintain a healthy biomass capable of degrading large amounts of animal waste in a shortened period of time as compared with a non-treated facility.

EXAMPLES

The invention may be more fully understood with reference to the following examples, which are not intended to limit the scope of the invention.

Example I

Bioremediation Of Two-Stage Anaerobic Swine Waste Lagoon

A process utilizing selected bacteria, enzymes and a diffused air system to control the ecology of a swine waste storage lagoon is described below.

A. Initial Characterization of Waste Facility

Manure from a two-stage anaerobic swine waste facility, consisting of a primary lagoon (approximately 1–1.5 million gallons) and secondary lagoon (approximately 2–2.5 million gallons), was sampled to identify baseline figures for filtered sulfide, sulfate, ammonia, volatile fatty acids (V.F.A.), chemical oxygen demand (C.O.D.), and pH. Fluid temperature of the lagoon during the treatment period averaged about 70–75° C.

At four locations throughout the primary lagoon and two locations throughout the secondary lagoon, a vertical cross section sample of the entire depth was taken. The samples were obtained by lowering a hollow PVC tube, fitted with a stopper at the bottom end of the tube, into the lagoons to a depth of about six feet. The tube was allowed to fill completely and the stopper activated to seal off the lower end of the tube. The tube was brought to the surface where the sample was transferred into one liter bottles which was then analyzed. Sampling and analysis was performed by an independent testing facility, Baumgartner Environics, Inc. (Olivia, Minn.). Standard analyses were used as indicated below:

| | |
|---|---|
| sulfide | EPA 375.4 |
| C.O.D. | EPA 410.1 |
| ammonia | EPA 350.3 |
| total solids | EPA 160.4 |
| volitile solids | epa 160.4 |
| sulfate | epa 375.4 |
| volitile fatty acids | J. Food Science 51:3, 1986 |

The data, expressed as the average analysis for the samples taken in mg/L of sample, are shown below in Table 2 (primary lagoon) and Table 3 (secondary lagoon).

B. Step 1: Inoculation With Sulfide-Utilizing Bacteria

A commercial, liquid consortium of sulfide-utilizing bacteria (Persnickety Brand 713™) was obtained from Syneco Systems, Inc. and used to inoculate the lagoons. The bacterial consortium was added to the lagoons to result in a final concentration of $10^6$–$10^8$ bacterial counts/mL of estimated lagoon content volume. The bacteria were allowed to oxidize the sulfides present in the lagoon over a 10 day period.

C. Step 2: Inoculation With Organic Digesting Bacteria

A powdered consortium of organic digesting bacteria (Digestase 900™) was obtained from Athea Labs (Milwaukee, Wis.). The mixture also contained lytic enzymes as described above. This mixture was suspended in warm water and added to the lagoons 10 days after addition of the anaerobic sulfide-utilizing bacteria. This second treatment innoculum contained bacteria from the genus Bacillus, particularly a mixture of the species *licheniformis, amyloliquifaciens,* and *subtilis,* as well as the enzymes protease, cellulase, amylase, and lipase. The bacterial/enzymatic consortium was added to the lagoons to result in a final concentration of $10^6$–$10^8$ bacterial counts/mL of estimated content of the lagoon.

A low pressure rotary vane compressor with optimum operating output of 10 psi and 10 cfm was connected to two manifolds each fitted with a 1–30 micron diffuser. The diffuser manifolds were placed equidistant from each other on the bottom of the lagoon to create a plumes of air which would rise to the surface thus mixing the waste and increasing contact time with the organisms.

Ten days after the initiation of the second treatment inoculation with organic digesting bacteria (twenty days after the initiation of the first treatment inoculation with sulfide-utilizing bacteria) each lagoon was sampled and analyzed as described above. The data are shown below in Tables 2 and 3.

TABLE 2

Primary Lagoon

| State of Analysis | Sulfide mg/L (ppm) | Sulfate mg/L | Ammonia mg/L | C.O.D. mg/L | V.F.A. mg/L | pH |
|---|---|---|---|---|---|---|
| Initial characterization (Day 0) | 3.29 | 238 | 5124 | 1438 | 1860 | 7.79 |
| After Step 1 Treatment (Day 10) | 2.1 | | | | | |
| After Step 2 Treatment (Day 20) | .82 | 47.5 | 1287 | 4395 | 988 | 7.57 |
| Percent Change | −75 | −80 | −75 | +206 | −47 | |

TABLE 3

Secondary Lagoon

| Stage of Analysis | Sulfide mg/L (ppm) | Sulfate mg/L | Ammonia mg/L | C.O.D. mg/L | V.F.A. mg/L | pH |
|---|---|---|---|---|---|---|
| Initial Characterization (Day 0) | .55 | 165 | 4323 | 1298 | 2800 | 8.17 |
| After Stage 2 Treatment (Day 20) | .35 | 47.5 | 1371 | 3160 | 1170 | 7.7 |
| Percent Change | −36 | −71 | −68 | +143 | −58 | |

Example 2

Bioremediation of Anaerobic Dairy Waste Lagoon

A process utilizing selected bacteria, enzymes and a diffused air system to control the ecology of a dairy waste storage lagoon is described below.

A. Initial Characterization of Waste Facility

An initial characterization of the contents of the dairy waste facility was conducted as described above for Example 1. Average temperature of the liquid waste during the treatment period was about 60° F.

Analysis of sulfide was performed on samples with solids rather than on filtered samples as described for Example 1. It is generally understood that the correlation between filtered and non-filtered sulfide content is that the filtered level is approximately 30–40% of the non-filtered level. The data shown below in Table 4 shows the analyzed non-filtered sulfide level, with the estimated filtered sulfide level shown in parentheses.

B. Step 1: Inoculation With Sulfide-Utilizing Bacteria

The dairy waste lagoon was inoculated with a consortium of sulfide-utilizing bacteria using the compositions and methods described above for Example 1.

C. Step 2: Inoculation With Organic Digesting Bacteria

At 15 days after the first treatment with the sulfide-utilizing innoculum, the dairy waste in the facility was treated with a second innoculum of organic digesting bacteria and lytic enzymes with the diffuser system, as described above for Example 1.

Thirty days after the initiation of the first treatment with sulfide-oxidizing bacteria, the dairy lagoon was sampled and analyzed as described above. The data are shown below in Table 4.

TABLE 4

Dairy Waste Facility

| Stage of Analysis | Sulfide* mg/L | Percent Total Solids | Percent Volatile Solids | Ammonia mg/L | C.O.D. mg/L |
|---|---|---|---|---|---|
| Initial Characterization (day 0) | 27.5 (8.25) | 5.03 | 82 | 500 | 6160 |
| After Step 1 Treatment (30 days) | 11 (3.3) | 3 | 78 | 1371 | 22,000 |
| Percent Change | −60 | −40 | −5 | +174 | +257 |

*Sulfides were analyzed on non-filtered samples.
Estimates of filtered-sample values are given in parentheses.

Example 3

Bioremediation of Anaerobic Swine Waste Lagoon

A process utilizing selected bacteria, enzymes and a diffused air system to control the ecology of a further swine waste storage lagoon is described below.

A. Initial Characterization of Waste Facility

An initial characterization of the contents of the swine waste facility was conducted as described above for Example 1. Average temperature of the liquid waste during the treatment period was about 60° F.

B. Step 1: Inoculation With Sulfide-Utilizing Bacteria

The swine waste lagoon was inoculated with a consortium of sulfide-utilizing bacteria using the compositions and methods described above for Example 1.

C. Step 2: Inoculation With Organic Digesting Bacteria

At 9 days after the first treatment with the sulfide-utilizing innoculum, the waste in the facility was treated with a second innoculum of organic digesting bacteria and lytic enzymes with the diffuser system, as described above for Example 1.

25 days after the initiation of the first treatment with sulfide-oxidizing bacteria, the lagoon was sampled and analyzed as described above. The data are shown below in Table 5.

TABLE 5

| Stage of Analysis | Filtered Sulfide (mg/L) | Ammonia (mg/L) | C.O.D. (mg/L) | V.F.A. (mg/L) |
|---|---|---|---|---|
| Initial Characterization (Day 0) | 6.9 | 418.8 | 2025.9 | 773.6 |
| After Step 1 Treatment (Day 9) | 1.3 | 976.0 | 1900.0 | 927.0 |
| After Step 2 Treatment (Day 25) | 0.23 | 1113 | 1710.0 | 892.0 |
| Percent Change | −97 | +166 | −16 | +15 |

The above specification, examples and data provide a complete description of the manufacture and use of the composition of the invention. Since many embodiments of the invention can be made without departing from the spirit and scope of the invention, the invention resides in the claims hereinafter appended.

We claim:

1. A process for treating animal waste comprising the steps of:
   (a) adding to sulfide-rich animal waste a first innoculum comprising sulfide-utilizing bacteria to produce a lowered-sulfide waste; and
   (b) adding to the lowered-sulfide waste a second innoculum comprising organic digesting bacteria.

2. The process of claim 1, wherein the animal waste is circulated on addition of the second innoculum.

3. The process of claim 1, wherein the second innoculum further comprises lytic enzymes.

4. The process of claim 1, wherein the first innoculum comprises one or more species of sulfide-utilizing bacteria listed in Table 1.

5. The process of claim 1, wherein the first innoculum comprises one or more species of *Chromanium, Rhodospirillum, Chlorobium, Chloroflexus,* and *Thiobacillus.*

6. The process of claim 1, wherein the second innoculum of organic digesting bacteria is added 0 to about 21 days after addition of the first innoculum of sulfide-utilizing bacteria.

7. The process of claim 6, wherein the second innoculum is added 3–21 days after the first innoculum.

8. The process of claim 7, wherein the second innoculum is added 7–14 days after the first innoculum.

9. The process of claim 1, wherein the second innoculum comprises one or more species of *Bacillus, Desulfotomaculum, Clostridium,* and *Deinococcacea.*

10. The process of claim 9, wherein the second innoculum comprises one or more species of *Bacillus.*

11. The process of claim 10, wherein the second innoculum comprises a mixture of the species *licheniformis, amyloliquifaceins,* and *subtilis.*

12. The process of claim 3, wherein the lytic enzymes comprise one or more of protease, lipase, amylase, or cellulase.

13. The process of claim 2, wherein said circulating is initiated simultaneously with or after addition of the second innoculum.

14. A process for treating animal waste comprising the steps of:
   (a) adding to animal waste a first innoculum comprising sulfide-utilizing bacteria to produce a lowered-sulfide waste having a filtered sulfide content less than 5 ppm; and
   (b) adding to the lowered-sulfide waste a second innoculum comprising organic digesting bacteria.

15. The process of claim 14, wherein the filtered sulfide content of the lowered-sulfide waste is less than 1 ppm.

* * * * *